United States Patent
Afrashteh et al.

(10) Patent No.: US 8,031,669 B2
(45) Date of Patent: Oct. 4, 2011

(54) SYSTEMS AND METHODS FOR INCREASING BASE STATION CAPACITY

(75) Inventors: Alireza Afrashteh, Great Falls, VA (US); Masoud Olfat, Clarksville, MD (US); Douglas A. Hyslop, Vienna, VA (US); Rajesh M. Gangadhar, Ashburn, VA (US)

(73) Assignee: Nextel Communications Inc., Reston, VA (US)

( * ) Notice: Subject to any disclaimer, the term of this patent is extended or adjusted under 35 U.S.C. 154(b) by 1324 days.

(21) Appl. No.: 11/192,075

(22) Filed: Jul. 29, 2005

(65) Prior Publication Data

US 2007/0025291 A1 Feb. 1, 2007

(51) Int. Cl.
*H04W 4/00* (2009.01)
(52) U.S. Cl. ......................................... 370/330; 370/478
(58) Field of Classification Search .................. 370/227, 370/330, 478; 455/442, 450, 452, 561
See application file for complete search history.

(56) References Cited

U.S. PATENT DOCUMENTS

| | | | |
|---|---|---|---|
| 5,933,421 A * | 8/1999 | Alamouti et al. | 370/330 |
| 7,336,626 B1 * | 2/2008 | Barratt et al. | 370/281 |
| 2002/0077068 A1 * | 6/2002 | Dent | 455/82 |
| 2002/0105935 A1 * | 8/2002 | Miya | 370/342 |
| 2002/0137547 A1 * | 9/2002 | Judson | 455/562 |
| 2002/0164986 A1 * | 11/2002 | Briand et al. | 455/442 |

OTHER PUBLICATIONS

Reply dated Apr. 1, 2009 in U.S. Appl. No. 11/192,074.
Office Action dated Jan. 2, 2009 in U.S. Appl. No. 11/192,074.

* cited by examiner

*Primary Examiner* — Ricky Ngo
*Assistant Examiner* — David Oveissi

(57) ABSTRACT

Systems and methods for enhancing the capacity of base stations are provided. A base station can operate in a time division duplex mode within a first frequency band. When a second frequency band is acquired for the base station's geographic region, a duplexer can be added to the base station. The base station can then operate in a frequency division duplex mode, where the first frequency band is used for base station downlink transmissions and the second frequency band is used for uplink transmissions.

13 Claims, 3 Drawing Sheets

SYSTEMS AND METHODS FOR INCREASING BASE STATION CAPACITY

BACKGROUND OF THE INVENTION

Wireless frequency spectrum is controlled by government bodies. These government bodies allocate the frequency spectrum to particular wireless operators, and place conditions on how the frequency spectrum is used. For example, allocated frequency spectrum is typically required to operate either in a time division duplex (TDD) or frequency division duplex (FDD) mode. In a system that operates using TDD, the uplink and downlink channels share the same frequency band, but are transmitted and received by the base station during mutually exclusive periods of time, as illustrated in FIG. 1. In a system that operates using FDD, the uplink and downlink channels are transmitted simultaneously on different frequency bands, as illustrated in FIG. 2.

In TDD systems additional frequency bands are typically obtained adjacent to existing frequency bands. Accordingly, the TDD channel bandwidth is expanded into the adjacent frequency band. For example, if a TDD system, which operates in a 5 MHz frequency band, obtains an additional 5 MHz frequency band adjacent to the existing frequency band, the frequency bandwidth is expanded to 10 MHz. This expansion is supported in time division code division multiple access (TD-CDMA), which supports a transition from a 5 MHz to 10 MHz frequency band with a chip rate change. Additionally, WiMAX, which supports scalable orthogonal frequency division multiple access (OFDMA), supports frequency bands between 1.25 MHz to 20 MHz through either increasing the tone spacing or the FFT size.

As new frequency spectrum is allocated to wireless network operators, it would be desirable reduce costs associated with adjusting base stations for operation over the newly allocated frequency spectrum.

SUMMARY OF THE INVENTION

Systems and methods for enhancing base station capacity are provided. In accordance with exemplary embodiments of the present invention, a base station can operate in a time division duplex mode over a first frequency band. When a second frequency band is acquired, a duplexer can be added to the base station and the base station can operate in a frequency division duplex mode. Specifically, the base station can transmit downlink signals over the first frequency band and receive uplink signals over the second frequency band. Because the first and second frequency bands may not be spectrally adjacent and may vary between different markets, the duplexer can be remotely tunable. Alternatively, the duplexers can be distributed to base stations within a market with the same fixed duplexer spacing.

Other objects, advantages and novel features of the present invention will become apparent from the following detailed description of the invention when considered in conjunction with the accompanying drawings.

BRIEF DESCRIPTION OF THE DRAWING FIGURES

DETAILED DESCRIPTION OF THE PREFERRED EMBODIMENTS

The 2.5 GHz frequency spectrum currently consists of TDD spectrum, and is being partially re-banded to support FDD. Ownership of this frequency spectrum is fragmented, with many licensees owning small channels within certain geographic limits. Moreover, the 2.5 GHz frequency spectrum may have non-uniform pairing of FDD spectrum.

Figure 1:
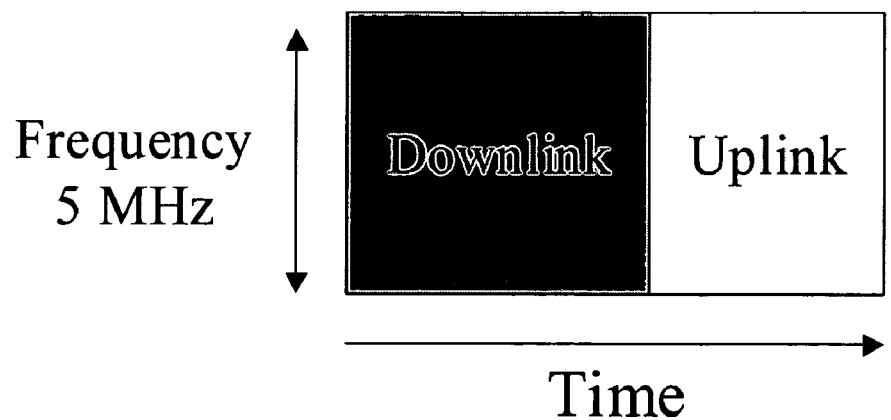
FIG. 1 illustrates a TDD uplink and downlink transmission.
Figure 2:
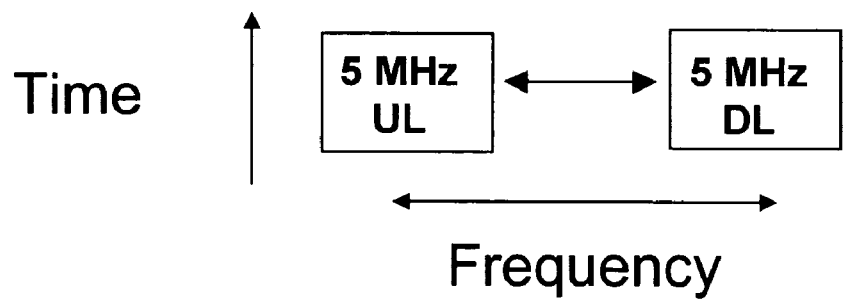
FIG. 2 illustrates an FDD uplink and downlink transmission.
Figure 3A:
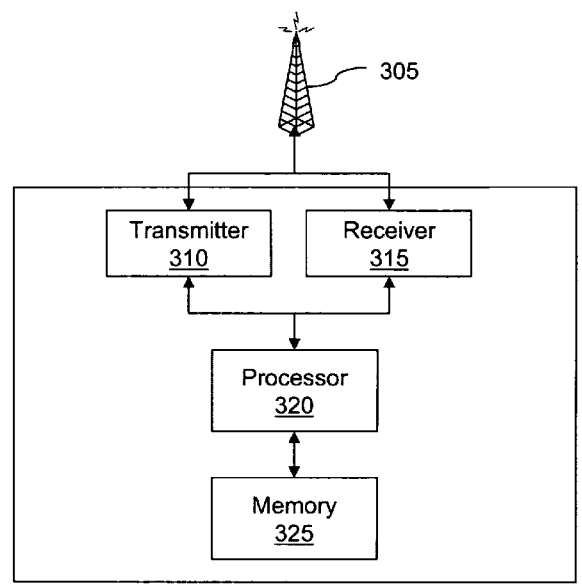
FIGS. 3a and 3b illustrate exemplary base stations.

FIG. 3a illustrates an exemplary base station which operates in a TDD mode. The base station includes a base station antenna 305 coupled to a transmitter 310 and receiver 315. The transmitter 310 and receiver 315 are coupled to a processor 320. Processor 320 can be a microprocessor, field programmable gate array (FPGA), application specific integrated circuit (ASIC) and/or the like. Processor 320 is coupled to a memory 325. Memory 325 can be a random access memory (RAM), read only memory (ROM), flash memory, hard disk and/or the like. The processor, in conjunction with memory 325, controls the transmitter 310 to transmit information to wireless stations (not illustrated) over a first frequency band during a first time period, and controls the receiver to receive information from wireless stations over a second frequency band during a second time period.

Figure 3B:
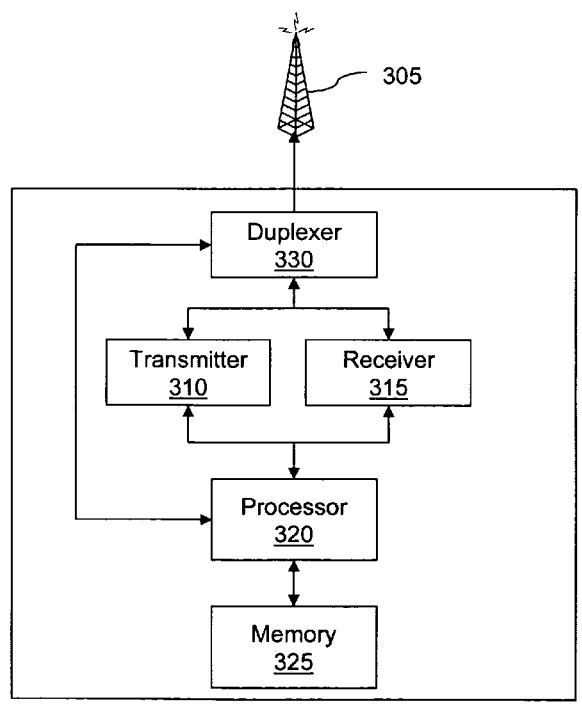

FIG. 3b illustrates an exemplary base station that operates in a FDD mode, in which like elements to those in FIG. 3a have like reference numerals. The processor 320 controls transmitter 310 to transmit over a first frequency band and controls receiver 315 to receive over a second frequency band. Because the transmitter 310 transmits over the first frequency band simultaneously with the receiver 315 receiving over a second frequency band, a duplexer is placed between these elements and base station antenna 305 to separate the frequency bands. Typically, FDD technologies have been designed for a clearly defined frequency bandwidth, with regulation-specified duplexer spacing. Accordingly, implementing flexible duplexer spacing in different markets has not been addressed.

In accordance with exemplary embodiments of the present invention, when a second frequency band is allocated to a base station which operates in a TDD mode over a first frequency band, the duplexer 330 is added to the base station. Because the newly acquired frequency band can be located anywhere in the existing frequency spectrum (i.e., it may not be adjacent to the existing frequency band or may not be regulation-specified), market specific duplexer spacing must be addressed. In accordance with exemplary embodiments of the present invention, the duplexer can come with a predetermined fixed frequency spacing based on the particular market. Alternatively, the base station can be provided with a market specific frequency spacing from a wireless network infrastructure (not illustrated), and the processor 320 can control the frequency spacing of duplexer 330 using the illustrated coupling.

Figure 4:
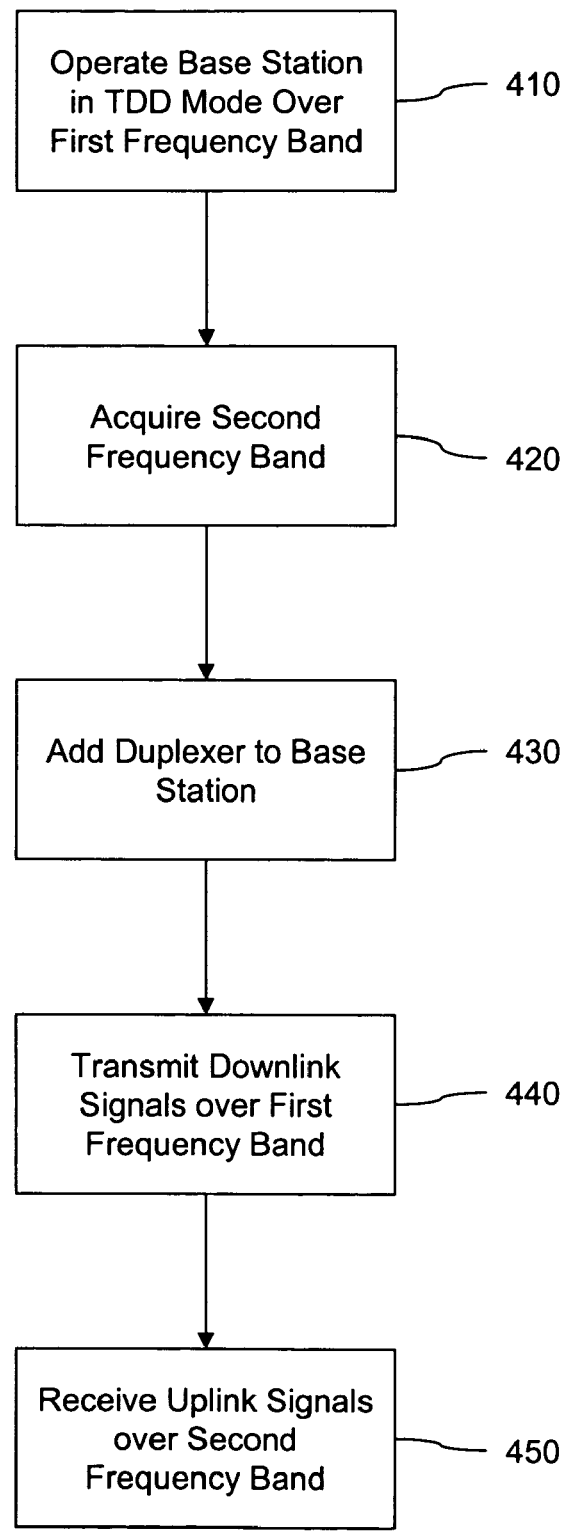
FIG. 4 illustrates an exemplary method for enhancing the capacity of a base station in accordance with the present invention.

FIG. 4 illustrates an exemplary method for enhancing the capacity of a base station in accordance with the present invention. The processor 320 controls the transmitter 310 and receiver 315 to operate in a TDD mode (step 420). When a second frequency band is acquired (step 420), a duplexer 330 is added to the base station (step 430). The processor 320 then controls the transmitter 310 to transmit over the first frequency band, and controls the receiver 315 to receive over the second frequency band. In order to configure the duplexers of wireless stations operating in a particular market, the base station can transmit the duplexer spacing between the first and second frequency bands over a control channel.

In accordance with exemplary embodiments of the present invention, a frequency band which is operated in a TDD mode is used in conjunction with a newly acquired frequency band to operate using the two frequency bands in an FDD mode. The cost of adding a duplexer, as is disclosed in the present invention, is much less than the costs of adding an additional transmitter and receiver to operate the first and second frequency bands in a TDD mode, while still achieving the same capacity of the additional frequency.

Although exemplary embodiments have been described in connection with a single base station, the present invention is equally applicable to increasing capacity of a number of base stations.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for increasing base station capacity, comprising the acts of:
    transmitting and receiving over a first frequency band in a time-division duplex mode;
    acquiring a second frequency band;
    enabling a duplexer coupled to the base station to transmit over the first frequency band and to receive over the second frequency band in a frequency division duplex mode after the transmitting and receiving over a first frequency band in a time-division duplex mode, wherein a frequency band spacing between the first frequency band and the second frequency band is not determined;
    sending the frequency band spacing to the base station after the frequency band spacing is determined to implement the frequency band spacing in the duplexer;
    transmitting over the first frequency band while simultaneously receiving over the second frequency band in the frequency division duplex such that the first and second frequency bands are separated by the frequency band spacing.

2. The method of claim 1, wherein the base station transmits a duplexer spacing over a control channel.

3. The method of claim 1, wherein the first and second frequency bands have a 5 MHz bandwidth.

4. The method of claim 1, wherein the first and second frequency bands are not spectrally adjacent to each other.

5. The method of claim 1, further comprising the act of:
    adjusting a frequency spacing of the duplexer based on the distributed frequency band spacing.

6. A base station, comprising:
    a transmitter, which transmits information;
    a receiver, which receives information;
    a processor, coupled to the transmitter and receiver; and
    a duplexer, coupled to the transmitter, the receiver, and the processor,
    wherein the processor controls the transmitter and receiver to transmit and receive over a first frequency band in a time-division duplex mode during a first period of time,
    wherein the processor receives a frequency band spacing between the first frequency band and the second frequency band of the duplexer and implements the frequency band spacing in the duplexer, and
    wherein after the frequency band spacing is implemented the processor controls the transmitter to transmit over the first frequency band while simultaneously controlling the receiver to receive over a second frequency band, such that the simultaneous transmission and reception over the first and second frequency bands are performed in a frequency division duplex mode that is distinct from the time-division duplex mode.

7. The base station of claim 6, wherein the processor causes the transmitter to transmit the frequency band spacing over a control channel.

8. The base station of claim 6, wherein the first and second frequency bands have a 5 MHz bandwidth.

9. The base station of claim 6, wherein the first and second frequency bands are not spectrally adjacent to each other.

10. A non-transitory computer-readable medium having computer-executable instructions for performing the acts of:
    controlling a transmitter and receiver to transmit and receive over a first frequency band in a time-division duplex mode during a first period of time;
    acquiring a second frequency band;
    receiving a frequency band spacing of a base station duplexer coupled to the transmitter and the receiver, wherein a frequency band spacing between the first frequency band and the second frequency band is not determined;
    receiving the frequency band spacing at the base station after the frequency band spacing is determined to implement the frequency band spacing in the duplexer; and
    controlling the transmitter to transmit over the first frequency band while simultaneously controlling the receiver to receive over the second frequency band, in a frequency division duplex mode that is distinct from the time-division duplex mode and such that the first and second frequency bands are separated by the frequency band spacing.

11. The computer-readable medium of claim 10, wherein the computer-executable instructions perform the further act of:
    causing the transmitter to transmit the frequency band spacing over a control channel.

12. The computer-readable medium of claim 10, wherein the first and second frequency bands have a 5 MHz bandwidth.

13. The computer-readable medium of claim 10, wherein the first and second frequency bands are not spectrally adjacent to each other.

* * * * *